United States Patent [19]

Hale et al.

[11] 4,415,177

[45] Nov. 15, 1983

[54] FOLDING WHEELCHAIR

[75] Inventors: Thomas K. Hale, Glendale; Peter P. Kavaloski, Los Angeles, both of Calif.

[73] Assignee: Lockheed Corporation, Burbank, Calif.

[21] Appl. No.: 330,837

[22] Filed: Dec. 15, 1981

[51] Int. Cl.[3] .............................................. B62B 11/00

[52] U.S. Cl. ...................................... 280/650; 297/45; 297/DIG. 4

[58] Field of Search ......... 280/42, 647, 650, 242 WC; 297/42, 44, 45, DIG. 4; 108/113; 211/201

[56] References Cited

U.S. PATENT DOCUMENTS

| | | | |
|---|---|---|---|
| 1,626,507 | 4/1927 | Camper | 211/201 |
| 2,629,607 | 2/1953 | Roubeck | 280/35 |
| 2,639,162 | 2/1953 | Schon | 280/42 |
| 3,142,351 | 7/1964 | Green | 180/DIG. 3 |
| 3,228,724 | 1/1966 | Resar | 297/45 |
| 3,666,292 | 5/1972 | Bartos | 280/234 |
| 4,025,088 | 5/1977 | Rothschild | 280/644 |
| 4,076,304 | 2/1978 | Deucher | 297/45 |
| 4,164,354 | 8/1979 | Rodaway | 280/42 |
| 4,170,368 | 10/1979 | Southward et al. | 280/242 WC |
| 4,266,305 | 5/1981 | Kavaloski et al. | 4/480 |
| 4,273,350 | 6/1981 | Williams | 280/647 X |
| 4,323,133 | 4/1982 | Williams | 280/42 X |

*Primary Examiner*—Joseph F. Peters, Jr.
*Assistant Examiner*—Michael Mar
*Attorney, Agent, or Firm*—Lowell G. Turner

[57] ABSTRACT

The invention is a folding wheelchair (10) having as its basic elements a frame (12), a folding backrest (48), a removable headrest (60), a set of rotatable foot pads (66), a set of rotatable arms (54), a set of four wheels (76), and a set of foldable handles (84) carried on a pair of slidable and recessing arms (82). The wheelchair is rendered foldable via a spider mechanism (90) comprising a body (92) and four leg elements (94). The end portions (96), (98) of the leg elements (94) are pivotally secured to the frame (12). Folding and unfolding of the chair is carried out by use of a handle (114) which rotates a set of cams (118). When the handle is in the horizontal or "lock" position, the central portions (108) of the leg elements (94) are locked in the wheelchair "unfolded" condition. When the handle is in the vertical or "unlock" position, the leg elements (94) are free to slide along a set of guide slots (116), permitting the wheelchair to be folded.

11 Claims, 8 Drawing Figures

FIG. 2
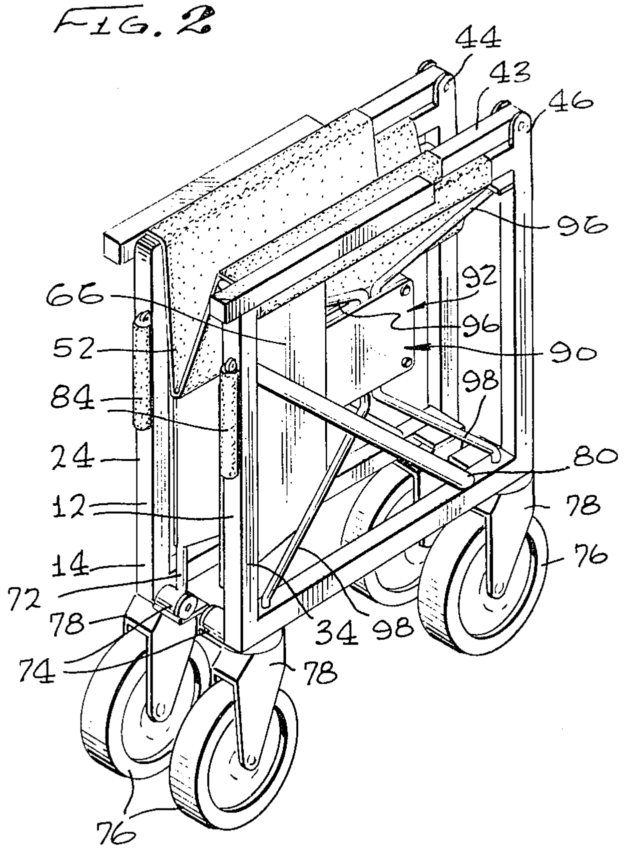
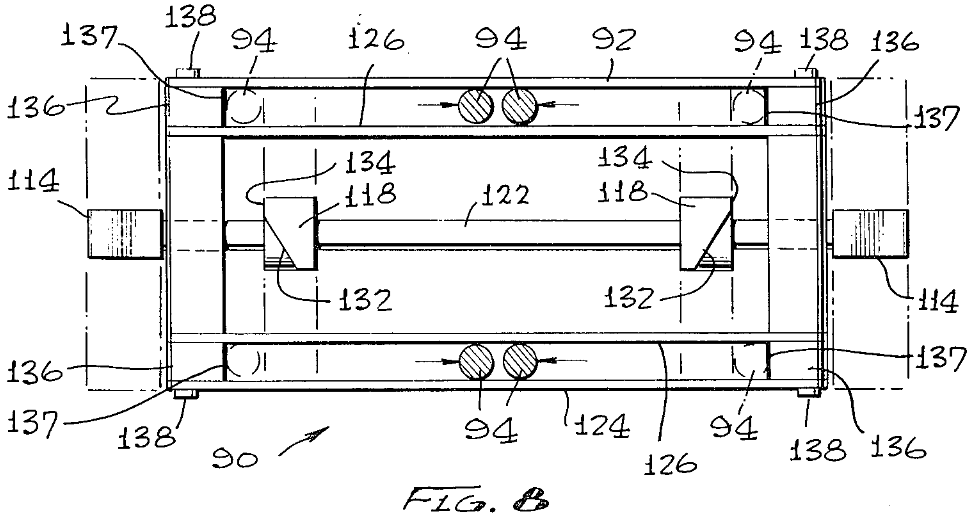
FIG. 8

FOLDING WHEELCHAIR

TECHNICAL FIELD

The invention relates generally to the field of transportation of disabled persons throughout the interiors of aircraft, trains, buses, ships and other vehicles, and more particularly to a folding wheelchair which is light and uniquely foldable for stowage in areas of limited space.

BACKGROUND OF THE INVENTION

The mobility of disabled persons has been increasing in recent years to include not only social and business life, but travel as well. Where once a disabled individual was expected to restrict travel away from home, today these special people are travelling around the world to conduct business or to vacation. Generally, this need for travel mobility felt by the disabled has been frustrated due to the lack of proper facilities and equipment aboard transportation vehicles. Over the years seat cost per mile has become paramount in the financial success of transportation companies and has increasingly dictated the size and shape of passenger vehicle interiors. Hence, narrow aisles, small lavatories, small stowage areas, and restricted use of transportation vehicle facilities have limited travel by the disabled communities.

As noted hereinabove, the aisles in transportation vehicles such as passenger aircraft, trains, buses, ships and the like are normally very narrow. Moreover, in vehicles such as these, stowage space is typically at a premium. Thus stowage space required to store items such as foldable wheelchairs is also at a premium. Ideally, such folding wheelchairs should be lightweight, should be of a size readily operable within narrow aisles, should be easy to fold and unfold in limited space working areas, and should fold into as narrow and compact a unit as possible.

Several designs for folding wheelchairs have been offered for use by the disabled which generally suffer from one or more disadvantages vis-a-vis transportation vehicle use. Examples of such devices are U.S. Pat. Nos. 3,666,292, 4,025,088, 4,076,304, and 4,164,354. The wheelchairs disclosed in these patents generally involve somewhat heavy and complex designs which include but are not limited to chair propelling and rotatable pivot type folding mechanisms (U.S. Pat. No. 3,662,292), multiple element collapsible X-frames U.S. Pat. No. (4,025,088), and single element X-frames (U.S. Pat. No. 4,164,354). In the case of U.S. Pat. No. 4,076,304 a rather complex slide-type folding system is disclosed which includes a linkage pinned at both ends, the center pivots being attached to a slide block which travels on a tube element to fold and unfold the wheelchair.

Other prior art carriers which utilize slide or linear translation type closure mechanisms are depicted in U.S. Pat. Nos. 2,629,607 and 2,639,162. U.S. Pat. No. 2,629,607 discloses a luggage carrier which utilizes a single level linkage having three sets of linkage elements pinned to a center bar. One of the three sets of linkages slides on the bar when the carrier is folded and unfolded. U.S. Pat. No. 2,639,162 is directed to yet another carriage which utilizes a center bar element and four sets of linkages. In this instance, one set of linkages, rather than sliding along the center bar, is attached to a telescoping tube within the center bar.

All of the above prior art patents, whether directed to wheelchairs or other type carriers, utilize rather complex folding mechanisms which include a multiplicity of hinged and pivoted parts. They thus have a tendency to be heavier than might otherwise be necessary, and in many cases, are folded into a package which is larger than might otherwise be desirable. This latter characteristic or problem is a natural consequence of utilization of complex folding elements.

One wheelchair design which is particularly useful for use in transportation vehicles is disclosed in U.S. Pat. No. 4,266,305, assigned to the assignee herein. This particular design, while finding great utility in transportation vehicles having bench type toilets, nevertheless is somewhat more complex than is necessary in many other uses in transportation vehicles which do not involve transporting a disabled person to such a toilet.

In view of the desire for enhanced mobility systems for the disabled, especially the desire for compact, inexpensive and non-complex wheelchairs for use by the disabled when using limited space transportation vehicles, there is a need for a folding wheelchair which satisfies all these requirements.

Thus it is a primary object of this invention to provide a novel folding wheelchair which is particularly well adapted for use with transportation vehicles.

It is another object of the present invention to provide an inexpensive and relatively non-complex folding wheelchair that can be easily and rapidly unfolded and folded and that is particularly well adapted to be put away in small stowage areas when in the folded condition.

DISCLOSURE OF INVENTION

The wheelchair of this invention functions within the confines of transportation vehicles to provide the disabled with travel mobility therein, and is particularly useful for mobility through aircraft cabins and the like. It permits a disabled person to be transported down a narrow aisle of a vehicle into and out of confined areas, and in its folded state, can be readily stowed in confined storage areas.

The wheelchair is held open (unfolded) and adaptable to be folded via a spider mechanism which includes a guide/lock body and eight legs. The legs form the end portions of four elements having a central portion thereof which is held and is slidable within the guide/-lock body. A set of handle-operated cams are utilized to, (1) hold the leg carrying elements firmly in a "wheelchair unfolded" position; and (2) release the leg carrying elements so that they may slide along the spider body into a "wheelchair folded" condition.

When the wheelchair of the present invention is folded, virtually every dimension; i.e., front to back, height, and side to side, is reduced to an appreciable extent.

The novel features which are believed to be characteristic of the invention, both as to its organization and its method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only, and are not intended as a definition of the limits of the invention.

BRIEF DESCRIPTION OF DRAWINGS

FIG. 2 is a perspective view of the wheelchair of FIG. 1 in its collapsed or folded stowage mode of operation;

FIG. 4 is a plan view taken on line 4—4 of FIG. 1;

FIG. 8 is a top plan view taken on line 8—8 of FIG. 5, showing the spider mechanism legs in a folded condition.

DESCRIPTION OF PREFERRED EMBODIMENT

As stated hereinabove, the purpose of the present invention is to provide a lightweight, foldable wheelchair, for stowage in areas of limited space, such as might be found on buses, trains and aircraft. In its unfolded mode of operation the wheelchair should be able to carry out such functions as aiding a disabled person to enter confined areas such as aircraft lavatories, work areas, buses, trains, and to proceed within narrow aisles and through narrow doorways, etc.

Figure 1:
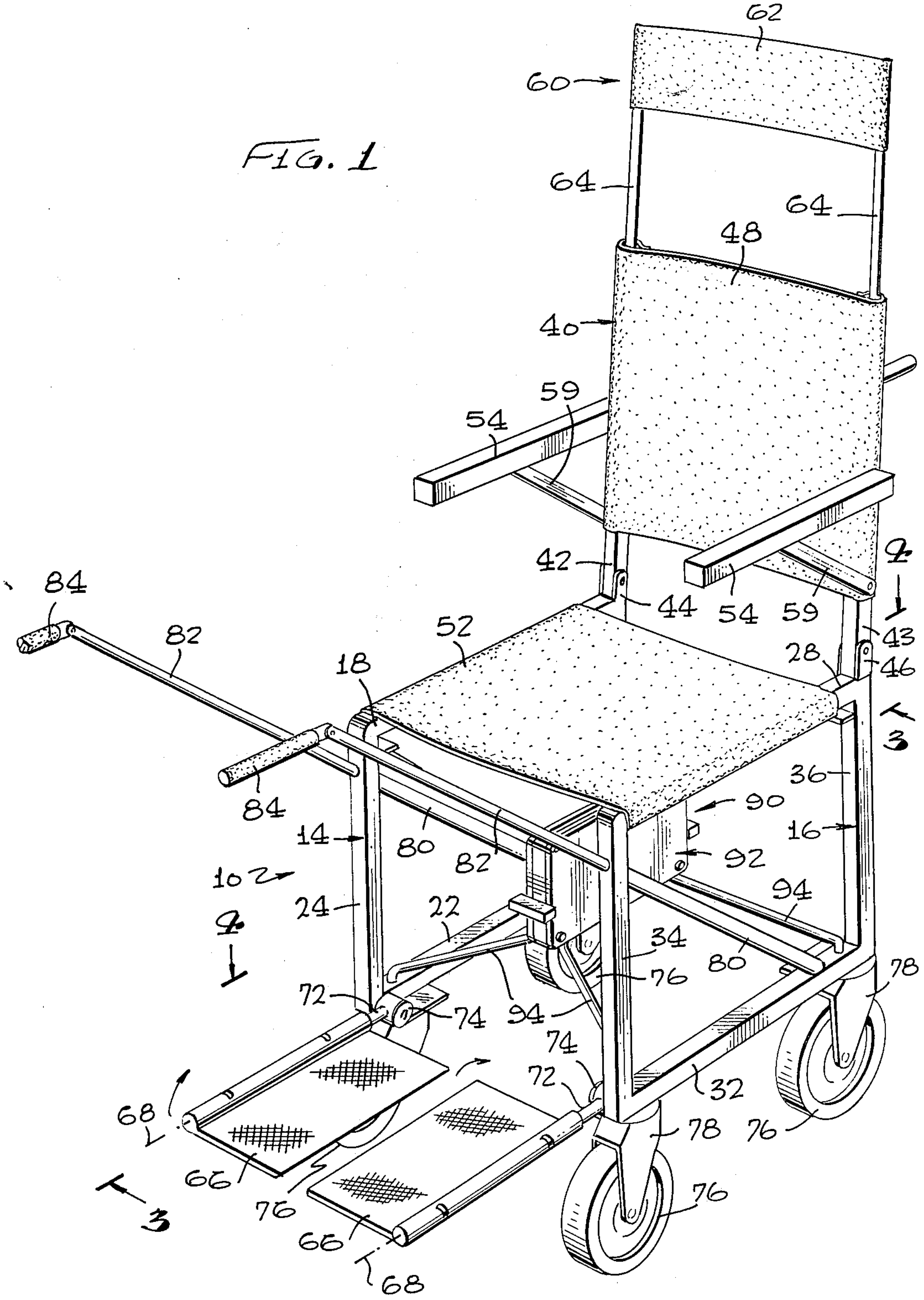
FIG. 1 is a front perspective view of the wheelchair of the present invention in the transport mode of operation, showing a spider mechanism holding the wheelchair in its unfolded condition.

Such a wheelchair is depicted in FIG. 1. FIG. 1 shows a foldable wheelchair (10) constructed in accordance with the present invention. The frame (12) of the wheelchair comprises two rectangular shaped frame members (14) and (16). Frame member (14) has top and bottom horizontal legs (18) and (22), respectively, and front and back upright legs (24) and (26), respectively. Frame member (16) has upper and lower horizontal legs (28) and (32) and front and rear upright legs (34) and (36) (FIG. 2).

Referring to FIG. 1, a seat back (40) comprises upright arms (42) and (43) pivotably connected to frame members (14) and (16) by brackets (44) and (46), respectively. A fabric backrest (48) may be secured to upright arms (42) and (43) by any suitable means, such as by rivets, stitching, or the like, while a flexible seat material (52) may be secured to horizontal legs (18) and (28) in like fashion. Arms (54) are shown extending from upright arms (42) and (43) supported by links (59), and may be rotated, secured and held by any suitable mechanism, as, for example, pivot and pin mechanisms disclosed in the aforementioned U.S. Pat. No. 4,266,305. A flexible headrest (60) comprises flexible material (62) secured to two vertical rods (64) which may be slidably inserted within upright arms (42) and (43).

Further support for the disabled passenger is provided by a pair of rotatable foot pads (66) which are rotatable about the axis (68) of rods (72) and which are additionally rotatable to a vertical position (as indicated by the arrows in FIG. 1) via a set of pivot brackets (74).

The wheelchair (10) is supported by four wheels (76) at each end of the wheelchair and the wheels are secured to brackets (78) which are pivoted to each lower corner of the frame in a well known manner. Also, a tube (80) is located on each side of the wheelchair (10) and extends from lower frame legs (22) and (32) to the upper ends of the front upright legs (24) and (34). Arms (82) extend from and are slidable into the tubes (80), and include pivoted handles (84). In the stowed position (FIG. 2), the pivoted handles (84) hang downwardly in front of the upright legs (24) and (34). When the arms (82) are pulled out of the tubes (80), the handles (84) can be rotated as shown in FIG. 1 to provide handles in front of the wheelchair in order to move and direct the wheelchair from the front. A rear handle (86) could be provided in any suitable fashion, for example as disclosed in the aforementioned U.S. Pat. No. 4,266,305, to provide movement and direction of the wheelchair from the rear.

As stated above, there is a high demand for folding mechanisms which will function to provide as compact a wheelchair unit for storage as possible. This desire is particularly critical for stowage in confined areas of commercial areas, as, for example, under seats or in small storage lockers or closets. The folding mechanisms of the present invention enables the provision of a folding wheelchair which is small, folds in a unique manner, is of lightweight and non-complex construction, is easily maneuverable, and which folds into a minimum volume for stowage.

Figure 3:
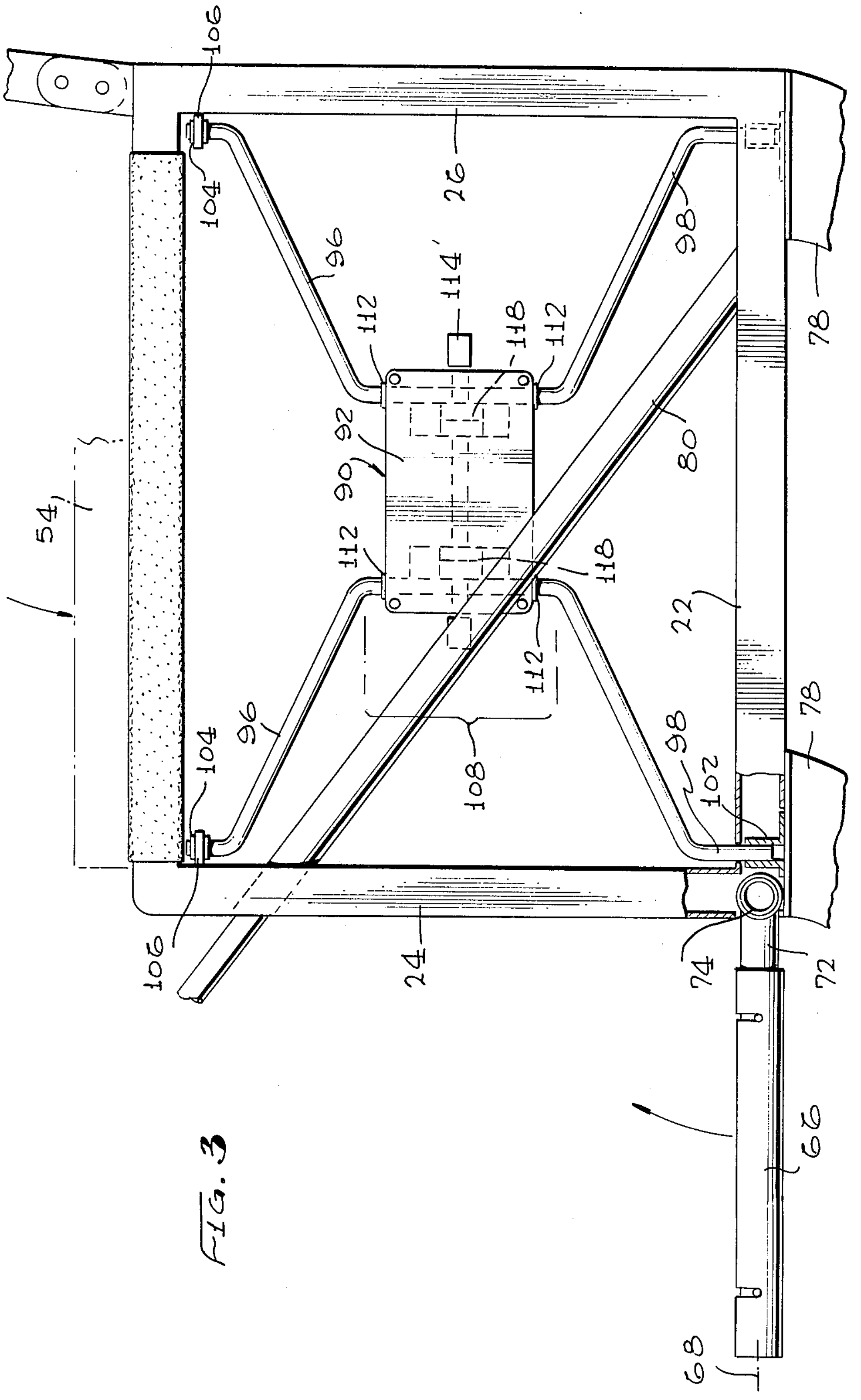
FIG. 3 is a fragmentary side elevation taken on line 3—3 of FIG. 1.
Figure 9:
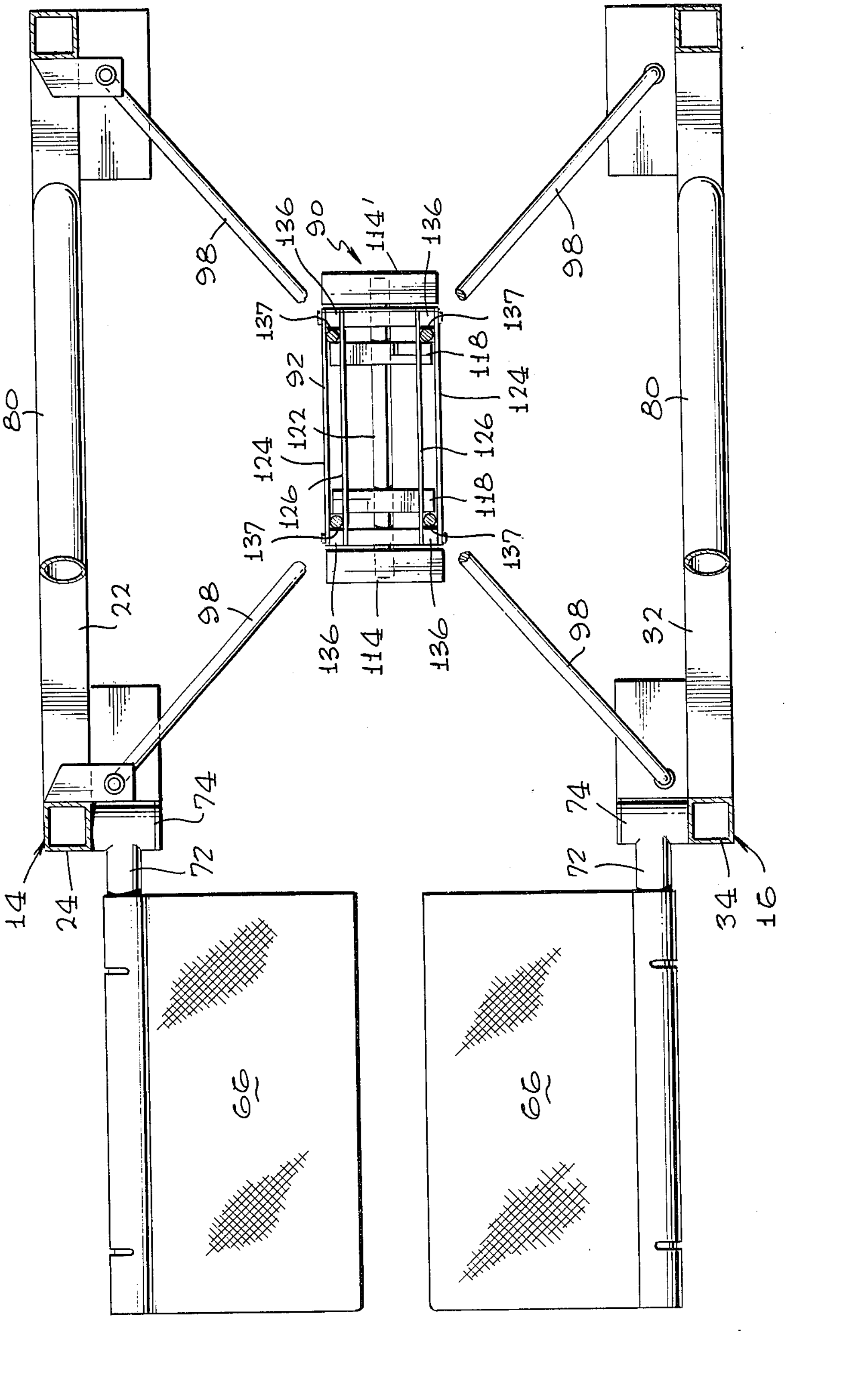
Figure 6:
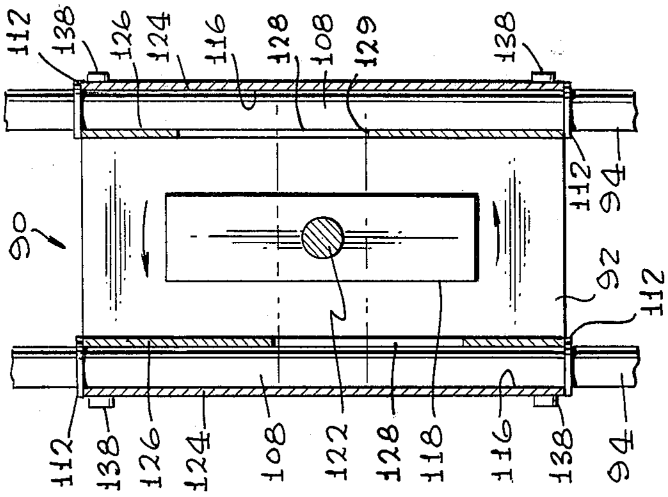
FIG. 6 is a cross-sectional view taken on line 6—6 of FIG. 5.

The folding mechanism of the present invention comprises a spider mechanism (90) having a body (92) and four leg elements (94). Each leg element (94) includes an upper support leg (96) and a lower support leg (98). As can best be viewed in FIG. 3, each upper support leg (96) (two shown) is pivotally secured to the upper end of one of the front upright legs (24), (34), or back upright legs (26), (36). The lower support legs (98) of the spider mechanism are pivotally secured within sleeves (102) located in lower horizontal legs (22), (32). The upper legs (96) are shown pivoted within a bearing sleeve (104) carried by tabs (106), which may be integrally formed with or attached to the upright legs (24), (26), (34) and (36). It should be readily apparent, however, that any suitable mechanism may be used to pivotally secure the support legs (96) and (98) to the wheelchair frame at the ends of either the horizontal legs (22), (32) or the upright legs (24), (26).

Referring to FIGS. 3-8, each of the central portions (108) of leg elements (94) is shown slidably retained within the spider body (92) by a set of retaining rings (112). The leg elements (94), depending on the position of handle (114), are either locked in the position shown in FIGS. 3 and 5 (unfolded), or are free to travel along the length of the spider body (92) within a pair of guide slots (116), to the wheelchair folded position shown in FIGS. 2 and 8.

Figure 5:
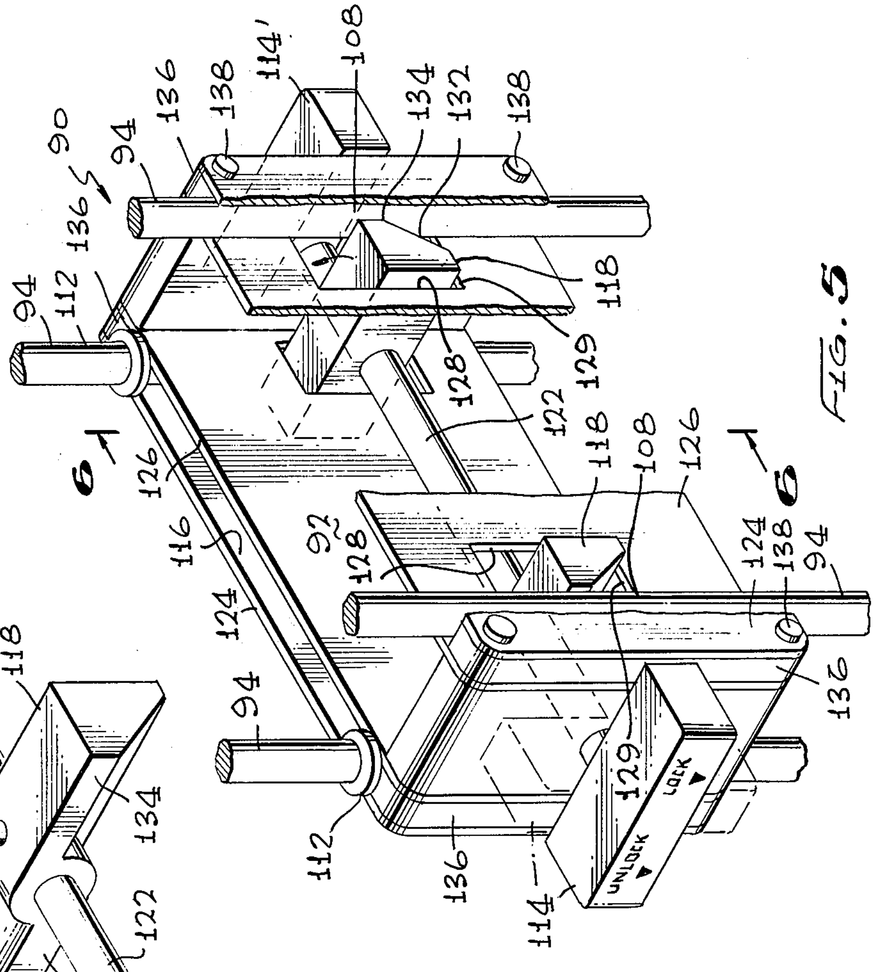
FIG. 5 is a perspective view, partially broken away, of the guide/lock body portion of the spider mechanism of FIG. 1.
Figure 7:
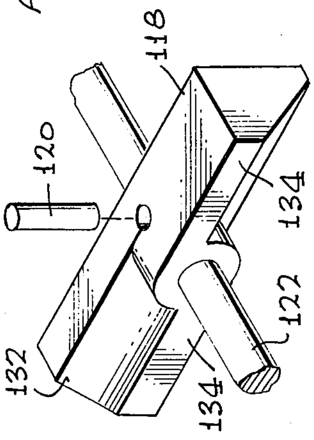
FIG. 7 is a perspective view showing a cam element of the guide/lock body of FIG. 5.

The locking mechanism of the spider body (92) utilizes two cams (118), shown in detail in FIG. 7, which are arranged to rotate as shown by the arrows in FIG. 5. The cams (118) are secured with pins (120) or the like to a shaft (122), one end of which is secured to the handle (114). Thus, when the handle (114) is rotated, the cams (118) also rotate. The guide slots (116) are formed by spaced apart outer walls (124) and inner walls (126), and accommodate entry of the end portions of the cams (118) via window openings (128) in the inner walls (126). The window openings (128) are dimensioned such that the sides (129) act as stops when the handle and the cams (118) are in the open or lock position. The dimensions of the leg elements (94) and the spider body parts are such that when the handle (114) is turned from the vertical position to that shown in FIG. 5, first the camming surface (132) and then the holding surface (134) of the cams (118) hold the central portion (108) of the leg elements (94) firmly against the slot end stops (136). The rigidity of the wheelchair in the unfolded position is achieved because the leg elements (94) extend at an acute angle to the frame members to which they are rotatably secured. With the leg elements at this acute angle no relative motion between the frame members is possible because the leg elements effectively restrain any motion. Resilient members (137), which may be constructed of rubber or other resilient material, adhesively or otherwise are secured to end stops (136) to prevent inadvertent turning or loosening of the portions (108) and the cams (118). When it is desired to fold the wheelchair, the handle (114) is turned to the vertical position releasing the leg elements to travel along the slots (116) so that the chair is folded.

In order to permit locking and unlocking of the leg elements (94) from either end of the wheelchair (10), a second handle (114) is shown in FIG. 5. Moreover, while spider body (92) is shown as being secured by four fasteners (138), it should be understood that any suitable fasteners, adhesives, and the like may be utilized for that purpose.

It is apparent that there has been provided with this invention a novel Folding Wheelchair which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A folding wheelchair having a seat, backrest, and a plurality of wheels, comprising:

(a) two frame members, said frame members each including upper segments defining therebetween the width of said seat when said wheelchair is in an unfolded position and lower segments for accepting said wheels;

(b) a spider mechanism adapted for holding said frame members in a spaced-apart wheelchair "unfolded" position and for providing means to collapse said frame members into a close proximity wheelchair "folded" position, said spider mechanism comprising:

first and second pairs of leg elements, each of said leg elements having upper and lower support legs including a central portion therebetween, first and second pairs of said upper support legs being rotatably secured to upper segments of first and second ones of said frame members, respectively, and corresponding first and second pairs of said lower support legs being rotatably secured to corresponding lower segments of said first and second frame members; and an elongated body having at least two generally parallel guide slots, said central portions of said first pair of leg elements being slidably retained in a first one of said guide slots and said central portions of said second pair of leg elements being slidably retained in a second one of said guide slots, said elongated body being arranged relative to said frame members such that when said wheelchair is in the unfolded condition said central portions are maintained against respective opposite ends of said guide slots, and when said wheelchair is in the folded condition, said central portions are positioned in the longitudinal center area of said guide slots; and means for maintaining said leg element central portions against said guide slot ends.

2. A folding wheelchair as in claim 1, wherein said upper segments comprise horizontal upper legs and said lower segments comprise horizontal lower legs, said frame members further comprising front and back vertical legs connecting the respective ends of said upper and lower legs.

3. A folding wheelchair as in claim 2, wherein said lower support legs are rotatably secured in respective end portions of said horizontal lower legs.

4. A folding wheelchair as in claim 3, wherein one each of said first and second pairs of upper support legs is rotatably secured to an upper portion of said front vertical legs and the other one of each of said first and second pairs of upper support legs is rotatably secured to an upper portion of said back vertical legs.

5. A folding wheelchair having a seat, backrest, and a plurality of wheels, comprising:

(a) two frame members, said frame members each including upper segments defining therebetween the width of said seat when said wheelchair is in an unfolded position and lower segments for accepting said wheels;

(b) a spider mechanism adapted for holding said frame members in a spaced-apart wheelchair "unfolded" position and for providing means to collapse said frame members into a close proximity wheelchair "folded" position, said spider mechanism comprising:

first and second pairs of leg elements, each of said leg elements having upper and lower support legs including a central portion therebetween, first and second pairs of said upper support legs being rotatably secured to upper segments of said first and second ones of said frame members, respectively, and corresponding first and second pairs of said lower support legs being rotatably secured to corresponding lower segments of said first and second frame members;

an elongated body having at least two generally parallel and equal guide slots, said central portions of said first pair of leg elements being slidably retained in a first one of said guide slots and said central portions of said second pair of leg elements being slidably retained in a second one of said guide slots, said elongated body being arranged relative to said frame members such that when said wheelchair is in the unfolded condition said central portions are maintained against respective opposite ends of said guide slots, and when said wheelchair is in the folded condition, said central portions are positioned in the longitudinal center area of said guide slots; and maintaining means comprising cam elements located at opposite ends of said guide slots for maintaining said leg element control portions against said guide slot ends.

6. A folding wheelchair as in claim 5, wherein said cam elements are rotatable about the longitudinal axis of said elongated body.

7. A folding wheelchair as in claim 6, wherein said guide slots are formed by internal and external walls of said elongated body, said wheelchair is unfolded and cams being located and said internal walls including openings whereby when said cams are rotated they intersect said guide slots at a distance from said guide slot ends so as to maintain said leg element central portions against said guide slot ends.

8. A folding wheelchair as in claim 7, wherein said elongated body includes handle means for rotating said cams.

9. A folding wheelchair as in claim 7 wherein said openings comprise windows one side of which act as stops when said cams are in their "wheelchair unfolded" position.

10. A folding wheelchair as in claim 5 including resilient members positioned between said respective guide slot ends and said central portions.

11. A folding wheelchair as in claims 1, 2, 3, 4, 6, 7, 8, 9, 10 or 5, wherein each of said leg elements are at an acute angle to said frame member to which they are rotatably secured.

* * * * *